US010057610B2

(12) United States Patent
Haberman et al.

(10) Patent No.: US 10,057,610 B2
(45) Date of Patent: *Aug. 21, 2018

(54) SYSTEMS, METHODS AND NON-TRANSITORY COMPUTER-READABLE MEDIA FOR ALLOCATING BANDWIDTH FOR DELIVERY OF CONTENT ELEMENTS ADDRESSED FOR A CONTENT OPPORTUNITY IN A TRANSPORT STREAM WITHIN A HOUSEHOLD-ADDRESSABLE MEDIA NETWORK

(71) Applicant: Visible World, Inc., New York, NY (US)

(72) Inventors: Seth Haberman, New York, NY (US); Gerrit Niemeijer, Maplewood, NJ (US)

(73) Assignee: Visible World, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,364

(22) Filed: Sep. 25, 2015

(65) Prior Publication Data
US 2016/0021403 A1    Jan. 21, 2016

Related U.S. Application Data

(63) Continuation of application No. 13/961,238, filed on Aug. 7, 2013, now Pat. No. 9,148,683.
(Continued)

(51) Int. Cl.
*H04N 21/2385* (2011.01)
*H04N 21/2343* (2011.01)
(Continued)

(52) U.S. Cl.
CPC ... *H04N 21/2385* (2013.01); *H04N 21/23439* (2013.01); *H04N 21/23614* (2013.01);
(Continued)

(58) Field of Classification Search
USPC .......... 709/226, 231; 725/32, 36; 705/14.43, 705/14.4, 14.49; 375/240.01, 240.02
See application file for complete search history.

(56) References Cited

U.S. PATENT DOCUMENTS

| 6,704,930 | B1 | 3/2004 | Eldering et al. |
| 7,962,637 | B2 * | 6/2011 | Su .................. H04N 21/234363 709/230 |

(Continued)

FOREIGN PATENT DOCUMENTS

| JP | 2009-141926 | 6/2009 |
| JP | 2011-530231 | 12/2011 |
| JP | 2012-004969 | 1/2012 |

OTHER PUBLICATIONS

Extended European Search Report and European Search Opinion, Feb. 22, 2016, from corresponding European Patent Application No. 13828345.2.

(Continued)

*Primary Examiner* — Hoang Vu A Nguyen Ba
(74) *Attorney, Agent, or Firm* — Baker & Hostetler LLP

(57) ABSTRACT

Systems, methods and computer-readable storage media for allocating content elements addressed for a content opportunity in a transport stream within a household-addressable media network. A content opportunity may include an advertising slot in a programming stream. The content elements may include advertising content configured to be run during the advertising slot. The advertising slot may be transmitted in a programming stream providing television programming and the advertising content may be provided in a commercial feed. The media network may be configured to transmit various content formats, such as high definition (HD), standard definition (SD), and variations thereof. Systems may be configured to allocate the highest profile corresponding content elements if there is sufficient resources available.

(Continued)

If sufficient resources are not available, the system may allocate lower profile versions of the content elements.

30 Claims, 6 Drawing Sheets

Related U.S. Application Data

(60) Provisional application No. 61/680,450, filed on Aug. 7, 2012.

(51) Int. Cl.
*H04N 21/647* (2011.01)
*H04N 21/81* (2011.01)
*H04N 21/236* (2011.01)
*H04N 21/2662* (2011.01)

(52) U.S. Cl.
CPC . *H04N 21/234309* (2013.01); *H04N 21/2662* (2013.01); *H04N 21/647* (2013.01); *H04N 21/812* (2013.01); *H04N 2201/212* (2013.01)

(56) References Cited

U.S. PATENT DOCUMENTS

| | | | |
|---|---|---|---|
| 8,843,983 B2* | 9/2014 | Gronning | H04N 21/23436 375/240.24 |
| 2005/0039205 A1 | 2/2005 | Riedl | |
| 2006/0184992 A1 | 8/2006 | Kortum et al. | |
| 2008/0034386 A1 | 2/2008 | Cherry et al. | |
| 2009/0144792 A1* | 6/2009 | Fielibert | H04N 21/23608 725/116 |
| 2009/0150943 A1 | 6/2009 | Vasudevan et al. | |
| 2009/0187939 A1 | 7/2009 | Lajoie | |
| 2010/0031285 A1 | 2/2010 | Haberman et al. | |
| 2010/0150252 A1* | 6/2010 | Camp, Jr. | H04L 65/4015 375/240.27 |
| 2010/0150531 A1 | 6/2010 | Corry et al. | |
| 2011/0064079 A1* | 3/2011 | Lim | H04L 12/185 370/390 |
| 2011/0099594 A1* | 4/2011 | Chen | H04N 21/23439 725/105 |
| 2011/0112909 A1 | 5/2011 | Singh et al. | |
| 2011/0161836 A1* | 6/2011 | Mu | H04L 12/1813 715/756 |
| 2011/0176496 A1 | 7/2011 | Roy et al. | |
| 2011/0191798 A1 | 8/2011 | Bassali et al. | |
| 2011/0209175 A1 | 8/2011 | Bassali et al. | |
| 2011/0296458 A1 | 12/2011 | Di Mattia et al. | |
| 2011/0299427 A1* | 12/2011 | Chu | H04L 12/1822 370/256 |
| 2013/0058393 A1* | 3/2013 | Soroushian | H04N 21/234372 375/240.01 |
| 2015/0012929 A1* | 1/2015 | Huber | H04N 21/6125 725/14 |
| 2016/0173925 A1* | 6/2016 | Gordon | H04N 21/2668 725/14 |

OTHER PUBLICATIONS

Convertino, et al, Wireless Adaptive Video Streaming by Real-Time Channel Estimation and Video Transcoding, 2005 Digest of Technical Papers, International Conference on Consumer Electronics (IEEE Cat. No. 05CH37619), Jan. 8, 2005, pp. 179-180, Piscataway, New Jersey, USA.

International Search Report and The Written Opinion of the International Searching Authority, dated Feb. 21, 2014, from corresponding foreign application PCT/US2013/053945, International Filing Date Aug. 7, 2013.

* cited by examiner

SYSTEMS, METHODS AND NON-TRANSITORY COMPUTER-READABLE MEDIA FOR ALLOCATING BANDWIDTH FOR DELIVERY OF CONTENT ELEMENTS ADDRESSED FOR A CONTENT OPPORTUNITY IN A TRANSPORT STREAM WITHIN A HOUSEHOLD-ADDRESSABLE MEDIA NETWORK

CROSS REFERENCE TO RELATED APPLICATIONS

This application is a continuation of U.S. application Ser. No. 13/961,238, filed Aug. 7, 2013, which claims the benefit of U.S. Provisional Application No. 61/680,450 filed on Aug. 7, 2012, both of which are incorporated herein by reference in their entireties.

FIELD OF INVENTION

The described technology generally relates to allocation of bandwidth in transport streams broadcast within a media network, and, more specifically, to allocating of bandwidth for delivery of content having different resource profiles based on the available resources of the transport streams.

BACKGROUND

Media networks may simultaneously broadcast multiple types of programming streams, such as high definition (HD) and standard definition (SD) programming streams. In general, HD programming may have a 16:9 aspect ratio and a resolution of about 1920 vertical lines of resolution by 1080 horizontal lines of resolution, or 1920×1080 (2.1 megapixels per frame) or 1280×720 (0.9 megapixels per frame). Standard definition (SD) is generally used to refer to signal formats that are lower than HD. Media networks may provide various types of content in the available formats based on user demand, content provider request, network requirements. The different formats require different resources, for example, HD content requires more bandwidth than SD bandwidth. In general, media networks increase resource utilization in order to provide higher profile content, such as transmitting HD content using additional bandwidth. However, increasing resource utilization to accommodate content introduces inefficiencies and decreases the profitability of providing multiple types of programming formats. Accordingly, media networks would benefit from methods configured to efficiently allocate bandwidth for content for transmission to viewers using existing resources.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Embodiments of the present invention provide for adaptive bandwidth management to allocate bandwidth resources between content of various formats and resolutions to ensure delivery of all content assets to the receiving end of a transmission. Embodiments of the invention determine the required bandwidth for delivery of scheduled or targeted content, and if insufficient resources, such as bandwidth, are unavailable, manage existing resources and content such that all content is assured of delivery through available content streams or channels.

In an embodiment, a system for allocating of bandwidth for delivery of content elements addressed for a content opportunity in a transport stream within a household-addressable media network may include a processor and a non-transitory, computer-readable storage medium in operable communication with the processor. The computer-readable storage medium contains one or more programming instructions that, when executed, cause the processor to detect a content opportunity in a transport stream, determine a plurality of content elements addressed for the content opportunity, allocate of bandwidth for a highest available profile version of each of the plurality of content elements to a highest profile available content stream responsive to the highest profile available content stream having sufficient resources, and allocate bandwidth for a lower profile version of each of the plurality of content elements remaining after allocation of the bandwidth for the highest profile available version of each of the plurality of content elements to a lower profile content stream.

In an embodiment, a computer-implemented method for allocating bandwidth for content elements addressed for a content opportunity in a transport stream within a household-addressable media network may include, by a processor, detecting a content opportunity in a transport stream, determining a plurality of content elements addressed for the content opportunity, allocating bandwidth for a highest available profile version of each of the plurality of content elements to a highest profile available content stream responsive to the highest profile available content stream having sufficient resources, and allocating bandwidth for a lower profile version of each of the plurality of content elements remaining after allocation of bandwidth for the highest profile available version of each of the plurality of content elements to a lower profile content stream.

In an embodiment, a computer-readable storage medium having computer-readable program code configured to allocate bandwidth for content elements addressed for a content opportunity in a transport stream within a household-addressable media network, the computer-readable program code may include computer-readable program code configured to detect a content opportunity in a transport stream, computer-readable program code configured to determine a plurality of content elements addressed for the content opportunity, computer-readable program code configured to allocate bandwidth for a highest available profile version of each of the plurality of content elements to a highest profile available content stream responsive to the highest profile available content stream having sufficient resources, and computer-readable program code configured to allocate bandwidth for a lower profile version of each of the plurality of content elements remaining after allocation of bandwidth for the highest profile available version of each of the plurality of content elements to a lower profile content stream.

BRIEF DESCRIPTION OF THE DRAWINGS

The above and other objects of the present invention will become more readily apparent from the following detailed description taken in connection with the accompanying drawings.

DETAILED DESCRIPTION

The described technology is generally directed to systems, methods and computer-readable media for allocation of resources for content addressed for a content opportunity in a broadcast stream. A media network may be configured to transmit content to customer premises equipment (CPE) in multiple formats or resolutions having different resource requirements, such as a high profile format and a low profile format. For instance, the high profile format may require more bandwidth within a transport stream than the low profile format. A non-limiting example of a high profile format is high definition (HD) content, while a non-limiting example of a low profile format is standard definition content (SD). Additional formats or resolutions may include, but are not limited to, 4K, 8K, 1080i, 1080p, 780i, 780p, or the like. According to some embodiments, the media network may be configured to provide high profile content in response to requests for high profile content until a resource threshold has been met. After the resource threshold has been reached, the media network may provide requested content in a low profile format. In this manner, the media network may provide the requested content without requiring additional resources, such as additional bandwidth.

Figure 1:
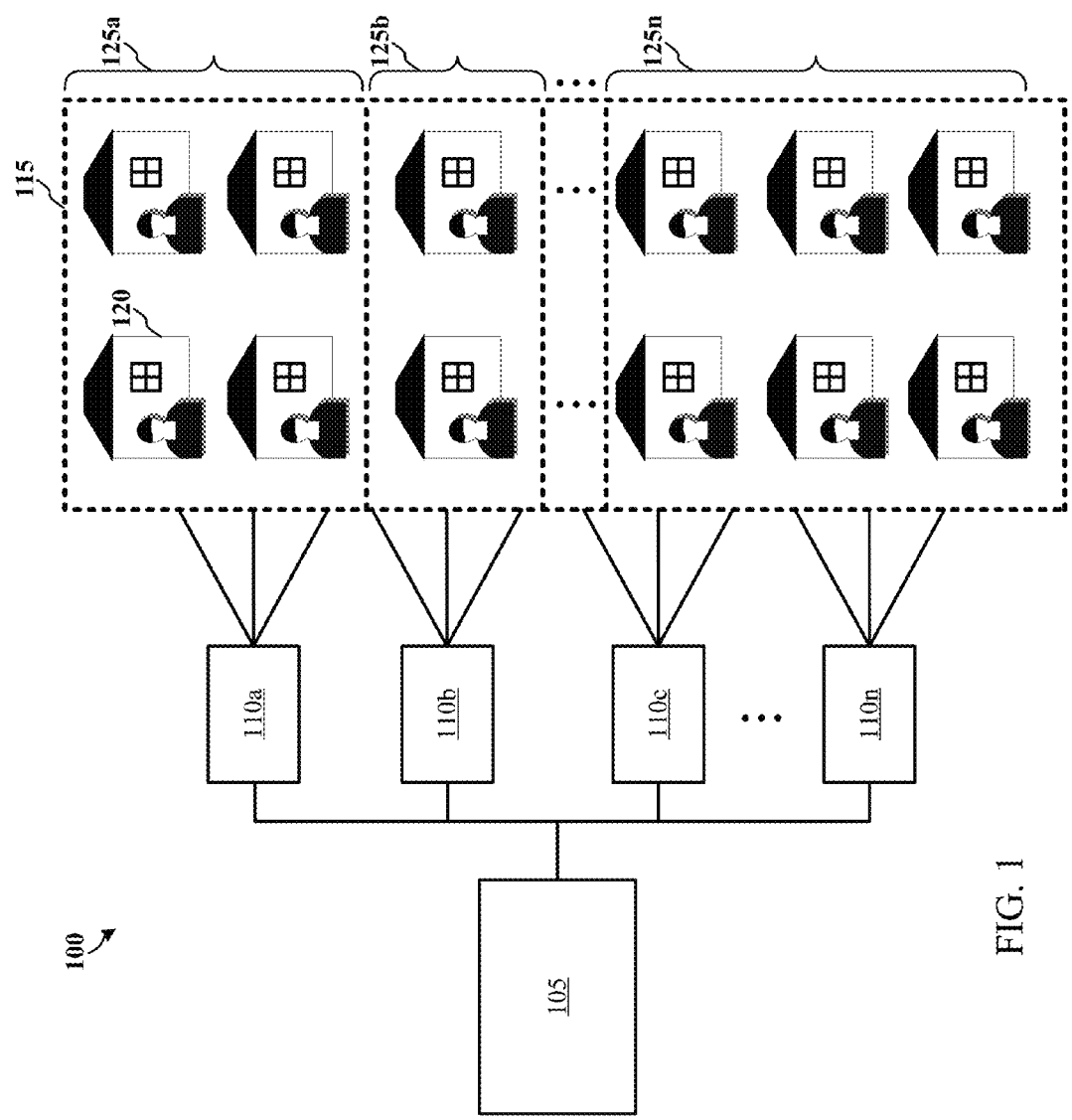
FIG. 1 depicts an illustrative media network according to some embodiments.

FIG. 1 depicts an illustrative media network according to some embodiments. As shown in FIG. 1, a media network 100 may include a media content provider 105. Non-limiting examples of a media content provider 105 include a television broadcast network, a cable television network, a satellite television network, an internet service provider (ISP), a computing device advertising network, a media distribution network, a cloud computing network, a local area network (LAN), a wide area network (WAN), terrestrial network, mobile network, 1-way network, 2-way network, or any combination thereof. The media content provider 105 may transmit content to one or more local content systems 110a-110n configured to communicate with an audience 115 of the media network 100. The local content systems 110a-110n may include equipment and systems configured to transmit media content received from the media content provider 105 to a defined portion of the audience 115. Illustrative and non-restrictive examples of a local content system 110a-110n include a cable television network headend, an internet service provider base station, or the like.

According to embodiments, the media content provider 105 may be configured to operate across physical device platforms and networks simultaneously. For example, content may be delivered to CPEs, such as set-top-boxes (STBs), Smart televisions (SmartTV) and/or digital video recorders (DVRs), over a cable television system, to mobile computing devices using standard network communication protocols (for instance, Ethernet or Wi-Fi) over an ISP network, to smart phone devices over standard telecommunication protocols (for instance, third Generation (3G), fourth Generation (4G), long-term evolution (LTE), or the like), and to home gateway devices through a LAN, WAN and/or ISP network.

The audience 115 may include a plurality of households 120 capable of receiving media content from the media network 100 through various receiver devices or customer premises equipment (CPE), including, without limitation, a STB, a television, a DVR, a personal computer (PC), a laptop computer, a mobile computing device, a smartphone, a tablet computing device, a home gateway, or the like. Although multiple households 120 are depicted in FIG. 1, only one is labeled to simplify the figure. The audience 115 may be divided into segments 125a-125n based on various segmentation factors. Non-limiting examples of segmentation factors include age, gender, occupation, years of home ownership, household size, income, geographic location, family size, media consumption habits, and combinations thereof. For example, an audience segment may include males between the ages of 25 to 35 with an annual income above $60,000.

According to some embodiments, the audience may be household addressable such that the media content provider 105 and/or the local content systems 110a-110n may direct particular content directly to each household 120 and/or segments 125a-125n of the audience 115. According to some embodiments, content may generally include any type of data capable of being received and consumed by a recipient. Illustrative and non-restrictive examples of content include advertising, entertainment programs, informational programs, messages, video, audio, graphical, and/or animated content. The media content provider 105 may direct particular media content, such as an advertisement or a television program, only to certain segments 125a-125n.

In an embodiment, the media content provider 105 and/or the local content systems 110a-110n may be configured to implement linear addressable systems, such as a linear addressable television advertising system. In a linear addressable system, content may be targeted to individual household 120 receiver devices, such as STBs, home gateways, and/or DVRs in a linear broadcast system. In general, a linear broadcast system may be configured to broadcast all or substantially all content (for example, programming networks) to all receiver devices within the audience 115.

Providing targeted content or targeted content elements, such as advertisements, within a linear broadcast system may require that receiver devices are able to access the targeted content during the time that the targeted content is scheduled to be shown, which may generally be referred to as an "avail." For example, targeted content elements may be transmitted on separate bandwidth or transport streams, such as a commercial feed stream.

The media content provider 105 may be configured to simultaneously broadcast program content to CPEs in multiple formats or profiles, including, without limitation, standard definition (SD) and high definition (HD) formats. The program content may be broadcast using a programming stream, such as an MPEG-2 encoded transmission stream, configured for the particular format of the content.

The programming stream may include content opportunities (placement opportunities, "avails," commercial slots, advertising slots, slots) for switching the programming stream being transmitted to the CPE to a different stream (a "content stream") to receive a content element. The CPE may switch back to the programming stream responsive to the completion of the content element. For example, a television programming stream may have a content opportunity which is configured as a "commercial break" in the programming. During the content opportunity, the CPE may switch from receiving the television programming stream to receiving a content stream, such as a commercial feeder stream configured to broadcast commercial content. After the content elements (for example, television commercials) in the commercial stream have completed, the CPE may switch back to the television programming stream. In general, the media network is configured to provide content elements having a profile that corresponds with the profile associated with the content opportunity. For example, a HD commercial may be presented for an avail on a HD programming stream.

In a household-addressable media network 100, multiple content elements may be transmitted for each content opportunity. For example, three content elements addressed to three different segments 125a-125n may be broadcast using one or more content streams. The appropriate content element may be selected for viewing by the user, for example, at the local content system 110a-110n level and/or at the CPE. As such, the media content provider 105 may broadcast multiple programming transport streams and multiple content streams for various types of formats. For example, a particular television network may be broadcast within the media network 100 over one HD programming stream and one SD programming stream. In addition, the media network 100 may transmit at least one HD content stream and one SD content, for instance, for commercials targeted for avails in the HD and SD programming streams.

The transmission of programming and content elements using multiple transport streams may have an effect on the resource requirements and efficiency of the media network 100. For example, adding resources, such as bandwidth through the addition of transport streams, may require equipment, network assets, and resource utilization requirements that may impact the cost-effectiveness of the media network 100 and the level of service provided to users. As such, media content providers 105 are limited in their ability to increase bandwidth in response to increased demand.

Providing household-addressable content, such as television advertisements, in high profile formats according to conventional technology is generally implemented by increasing the available bandwidth, for instance, by transmitting content using additional transport streams. For example, a media network may be configured to provide HD and SD programming. A HD programming stream may be configured to transmit two television networks. The HD programming stream may include a content offering that the media content provider has sold to an advertiser requiring three household-addressable HD advertisements. A corresponding HD content stream for transmitting the HD advertisements may similarly only transmit two commercials during the same content offering slot. According to existing technology, the media network may either fail to transmit one of the three HD advertisements or transmit the three HD advertisements using two HD content streams (the first two HD advertisements on one HD content stream and the third HD advertisement on the second HD content stream). However, such systems are not flexible and are not optimized for resource utilization, such as the allocation and use of network bandwidth. For instance, once the HD avail starts, a system configured according to conventional technology may either increase resource utilization or partially fail the household-addressable avail.

Figure 2:
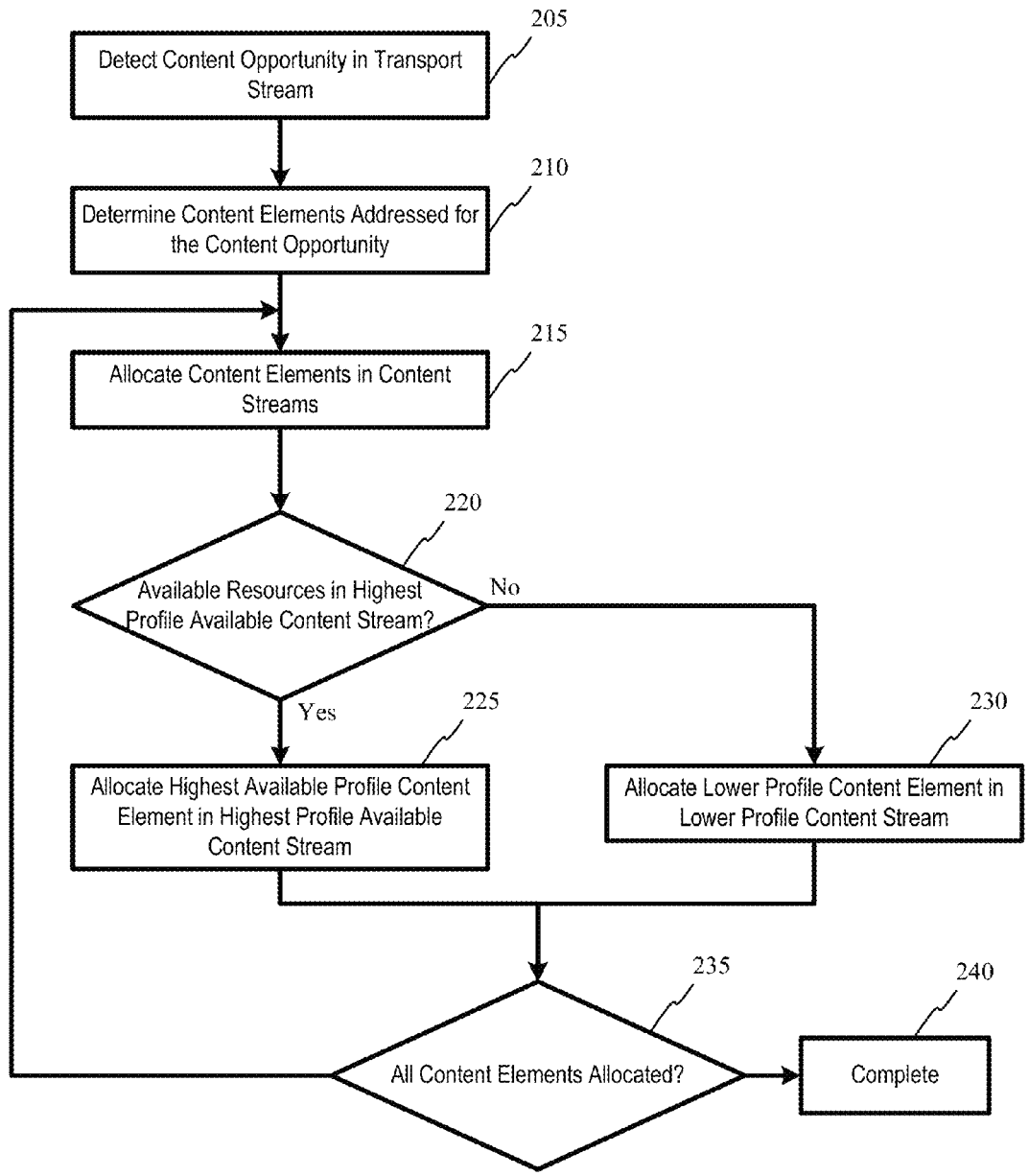
FIG. 2 depicts a flow diagram for an illustrative bandwidth allocation method configured according to some embodiments.

Accordingly, some embodiments described herein may be configured to dynamically adapt the allocation and/or the format of bandwidth for content elements addressed for a content offering. FIG. 2 depicts a flow diagram for an illustrative bandwidth allocation method configured according to some embodiments. In various embodiments, the components described herein with respect to FIG. 2 may generally be combined in any order and/or any combination, are not limited by the order described herein, and may contain more or fewer components. The steps described in FIG. 2 are described as being carried out by a system, which may include various components of a media network, such components of media network 100 depicted in FIG. 1, including one or more computing devices, servers, network equipment components, software applications, or the like.

As shown in FIG. 2, a system may detect 205 a content opportunity in a transport stream. For example, the content opportunity may be an avail for a television program in a programming stream. The programming stream may include various formats, such as a high profile format, including an HD format. In general, the format of the programming stream will not be the lowest format available in the media network. For instance, the media format may be an HD transport stream in a media network configured to transmit HD and SD transport streams. The system may determine 210 the content elements addressed for the content opportunity. For example, multiple household-addressable commercials may be targeted for the content slot, such as three versions of a television commercial aimed at three different media network audience segments.

The system may allocate bandwidth 215 for the content elements in available content streams. For example, the media network may include one high profile (for example, HD) content stream and one low profile (for example, SD) content stream for transmitting content elements. In an embodiment, the content streams may be configured as commercial feeds within the media network. The system may determine 220 whether there are resources available in the highest profile available content stream. For example, resources may include bandwidth, number of channels, bitrate, or other limiting aspect of a transport stream. In general, the highest profile available content stream may be the content stream having a profile that corresponds with the profile of the programming stream associated with the content opportunity. For example, the content opportunity may be in a high profile programming stream, such as an HD programming stream. As such, the highest profile available content stream may include a high profile (HD) programming stream.

If the system determines 220 that resources are available, then bandwidth for a highest profile available content element is allocated 225 in the highest profile available content stream; otherwise, bandwidth for a lower available content element is allocated 230 in a lower profile available content stream. For instance, if the transport stream is a HD programming stream, then the system may determine 220 whether enough resources are available in a HD commercial stream. If there are sufficient resources, the system may allocate 225 bandwidth for an HD commercial in the HD commercial stream at a time corresponding with the content opportunity. If there are not sufficient resources, the system may allocate 230 bandwidth for a SD commercial in a SD commercial stream at a time corresponding with the content opportunity.

In this manner, a media network system may have the flexibility to allocate bandwidth for content elements within existing bandwidth and/or limit the expansion of bandwidth by allocating bandwidth for content having various profiles. As described in reference to FIG. 2, some embodiments provide for a media network system that may dynamically allocate bandwidth for content having a different profile than the original profile associated with the requested content in order to manage system resources while maintaining the delivery of requested content.

In an embodiment, the system may generate and/or have access to content elements of available profiles and may select therefrom when allocating 225, 230 bandwidth for content elements. In another embodiment, the system may dynamically change, modify, transcode, or otherwise transform the profile of a content element in order to allocate bandwidth for the content element in a content stream. For example, the system may be configured to encode a HD content element as a SD content element as required. According to some embodiments, the system may be configured to modify the profile of multiple content elements in order to meet certain resource requirements. For instance, if three SD content elements are encoded at about 4 Mbps and only 10 Mbps of bandwidth is available, the system may transcode all three SD content elements to about 3.33 Mbps.

The system may determine 235 whether bandwidth for all content elements have been allocated. If the system determines 235 that all bandwidth for content elements have been allocated, the allocation process is complete 240 for the content opportunity; otherwise, the system may continue to allocate 215 bandwidth for the content elements into the content streams.

In an embodiment, a media network may allocate bandwidth for content elements based on one or more factors in addition to the methods described according to embodiments described herein. For example, embodiments may be configured to prioritize content elements, content opportunities, segments, or the like so that bandwidth for certain content elements have a higher priority for being allocated in high profile versions as compared to lower priority content elements. According to various embodiments, content elements may be prioritized based on price, segment demographics, content type, or the like. For example, a media network may sell content opportunities to content providers at a higher rate in order to have bandwidth for content elements targeted therefor have a higher priority for being allocated as a high profiler version. In another example, the media network may prioritize bandwidth for certain segments for being allocated higher profile versions, such as a segment known to have a HD television may be prioritized over a segment less likely to have a HD television or viewers in an age group of 25-45 being prioritized over an age group of 65 and above. In a further example, content elements may be prioritized based on content type, for instance, program promotions may be prioritized over product advertisements. According to such embodiments, the system may determine which content element to allocate first so that it may have the highest probability of being allocated in a high profile version.

Although HD and SD profiles have been used as examples herein, embodiments are not so limited, as any type of media profile, format, system, compression, encoding level, or the like, that may be used according to some embodiments is contemplated herein. For example, a media network may include multiple profiles based on encoding levels, such as HD at 6 Mbps, HD at 9 Mbps, HD at 11 Mbps, and so on.

In one example, a media network may use three formats, a first format, a second format, and a third format, each with various resource requirements. In this example, the first format requires the most of a particular resource, the third format requires the least of a particular resource, and the second format requires the resource at a level between the first and the third. According to some embodiments, a media network may attempt to allocate bandwidth for content elements having a certain profile (for instance, the profile associated with the programming stream that includes the content opportunity) and, if sufficient resources (for instance, bandwidth) are not available, the system may attempt to allocate bandwidth for content elements having a lower profile.

In this example, the media network may attempt to allocate bandwidth for four content elements in a first profile content stream in response to detecting a content opportunity in a first profile programming stream. The first profile content stream may have sufficient resources for the first content element. As such, the media network may allocate bandwidth for a first profile version of the first content element in the first profile content stream. The first profile content stream may not have sufficient resources for the second content element and the media network may attempt to allocate bandwidth for the second content element in a second profile content stream. The second profile content stream may have sufficient resources for the second content element. The media network may then allocate bandwidth for a second profile version of the second content element in the second profile content stream. The first profile content stream and the second profile content stream may not have sufficient resources for the third content element. As such, the media network may attempt to allocate bandwidth for the third content element in the third profile content stream. The third profile content stream may have sufficient resources for the third content element. Accordingly, the media network may allocate bandwidth for a first profile version of the third content element in the third profile content stream. The media network may determine that the first profile content stream now has sufficient resources for the fourth content element and may allocate bandwidth for a first profile version of the fourth content element in the first profile content stream.

Figure 3A:
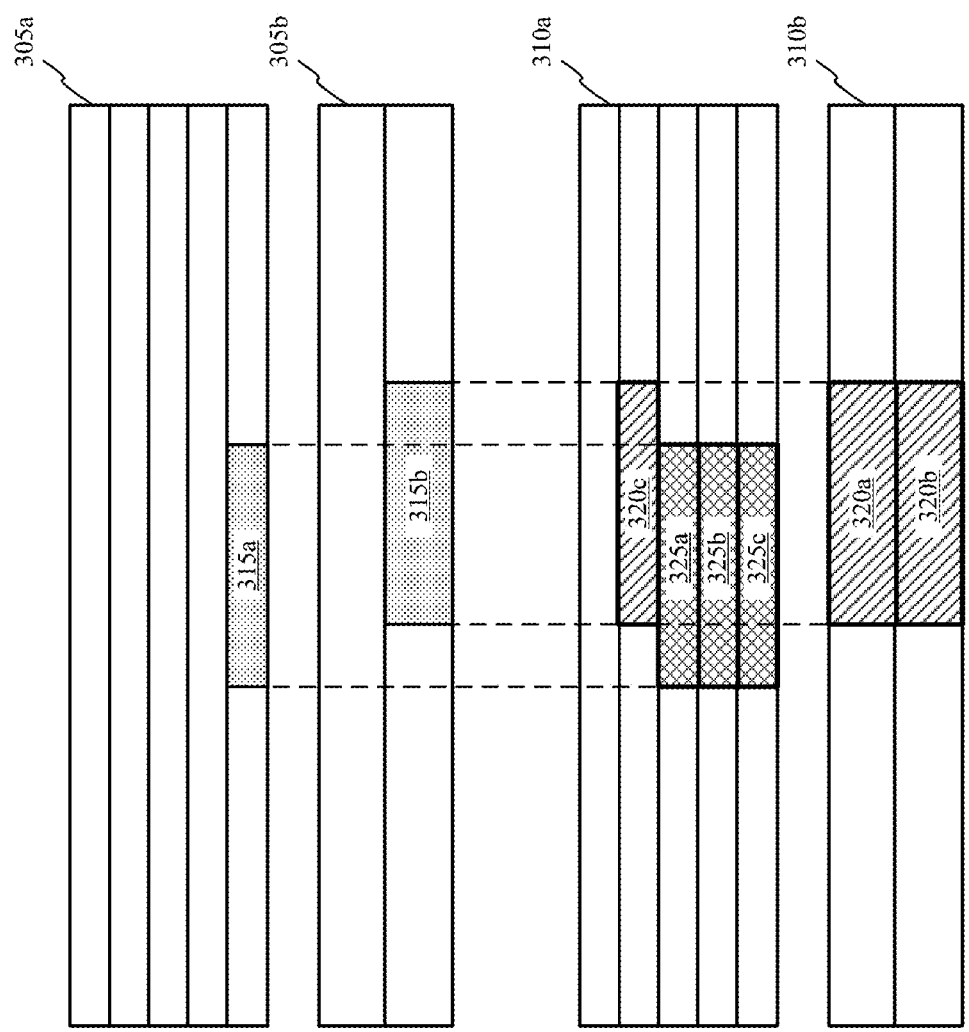
FIGS. 3A-3C depict illustrative bandwidth allocation systems according to some embodiments.
Figure 3B:
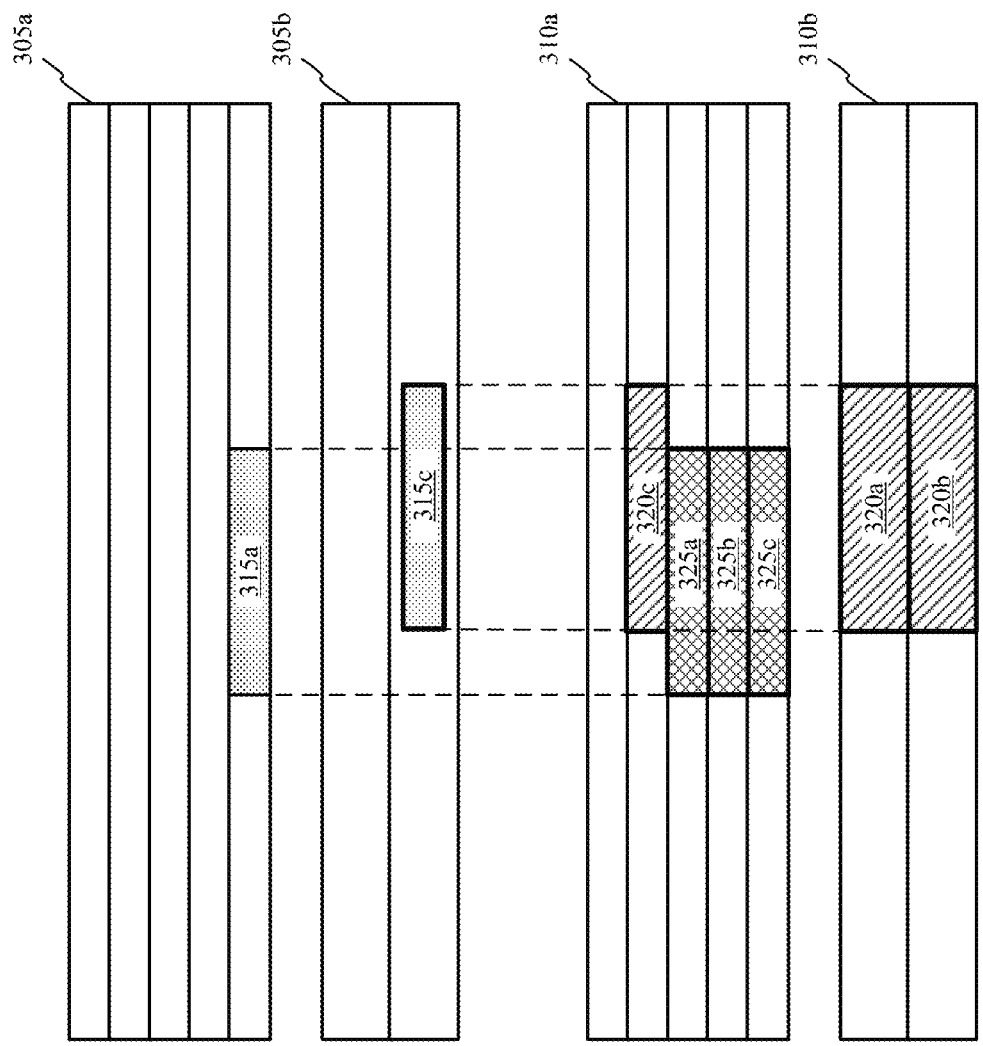
Figure 3C:
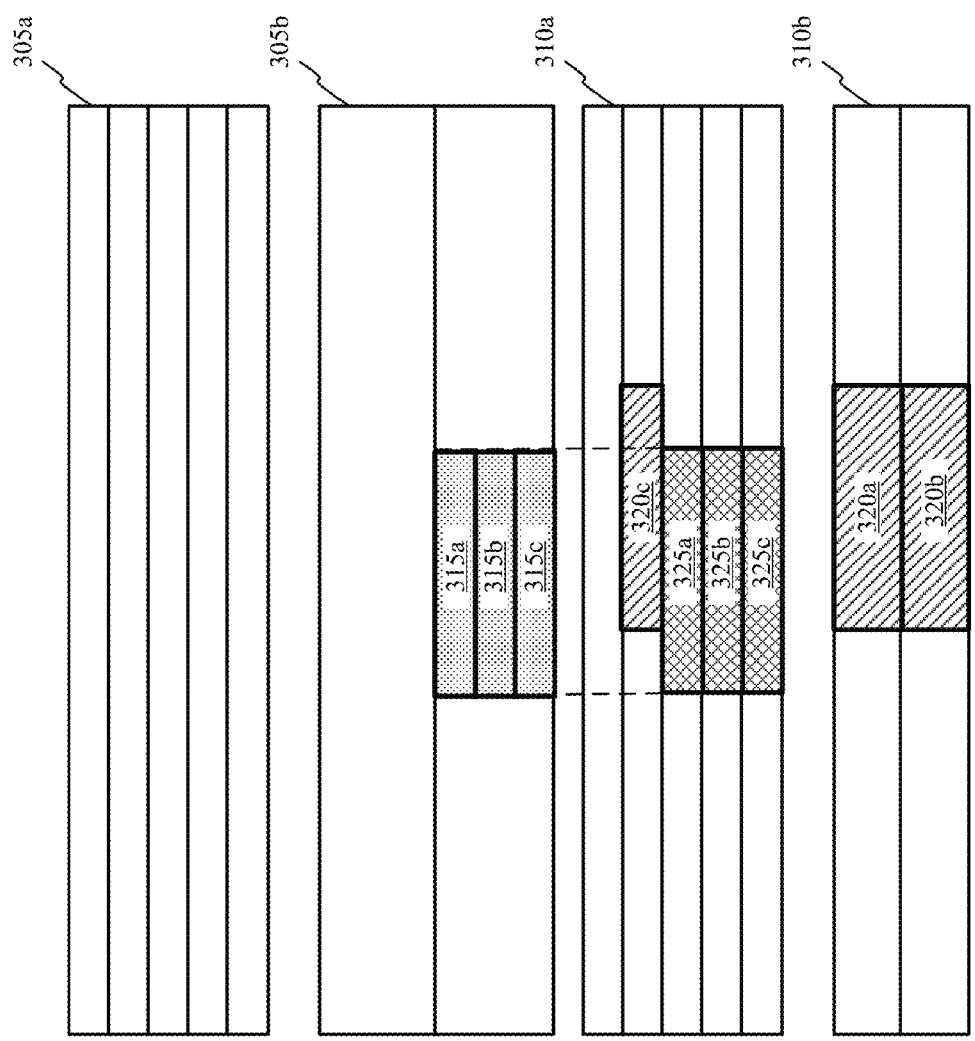

FIGS. 3A-3C depict an illustrative content allocation system according to some embodiments. As shown in FIG. 3A, a SD programming stream 305a and a HD programming stream 310a may be transmitted within a media network, such as media network 100 depicted in FIG. 1. According to some embodiments, the SD programming stream 305a and the HD programming stream 310a may broadcast SD and HD versions, respectively, of the same television network. Avails 315a, 315b may be transmitted over the HD programming stream 305b and the SD programming stream 310a. The avails 315a, 315b may be slots for the same commercial purchased by the same advertiser. As depicted in FIG. 3A, the avail 315a for the HD programming stream 305a may be delayed compared to the avail 315b for the HD programming stream 305b due to certain characteristics of the HD format that require longer processing and/or transmission times as compared with SD programming.

In general, SD content is encoded at a lower bitrate as compared with HD content, as such, the HD programming stream 305b may have fewer networks per transport stream as compared with the SD programming stream 305a. In an embodiment, the SD programming stream 305a and the HD programming stream 310a may include MPEG-2 transport streams. In the example of FIG. 3A, the HD content is encoded 2:1 (for example, 2 HD streams in 1 transport stream) and the SD content is encoded at 5:1.

In the example embodiment depicted in FIG. 3A, three household-addressable advertisements have been targeted for the avails 315a, 315b. For example, two different types of a first commercial addressed to a first and a second audience segment, respectively, and a third commercial addressed to a third segment. The SD household-addressable advertisements 325a-325c associated with the SD avail 315a may be allocated to a SD commercial feed 310a. An HD commercial feed 310b only has two streams for allocating content. As such, bandwidth for HD versions of commercials 320a and 320b are allocated to the HD commercial feed 310b. The media network allocates bandwidth for a SD version of commercial 320c to an available stream in the SD commercial feed.

In an alternative embodiment, as depicted in FIG. 3B, the bandwidth for avail 315c is allocated to the SD version of commercial 320c contained within the HD programming transport stream. As described above, this may occur when the number of targeted HD avails exceeds the HD bandwidth and one or more of the avails needs to be stepped down to a SD format. Similarly, as depicted in FIG. 3C, the bandwidth of avails 315a-315c is allocated, in the manner described above, to SD versions of commercials 325a-325c and inserted to the HD programming stream.

According to one embodiment of the invention, SD and HD commercials may be inserted in real-time into the programming streams according to a pre-defined schedule, such as scheduled commercial blocks, set off by cue tones or other triggers, to be displayed on a device tuned to the programming stream. Alternatively, one embodiment provides for determining available bandwidth in the programming transport streams to deliver content for playback at a later time. Such content may be buffered of stored for a longer time in a data store at the receiving end of the transmission, such as the STB, television memory, mobile device memory, or the like. The content stored in such a manner may include instructions for the local device to assemble, insert or playback the content at a later time.

Figure 4:
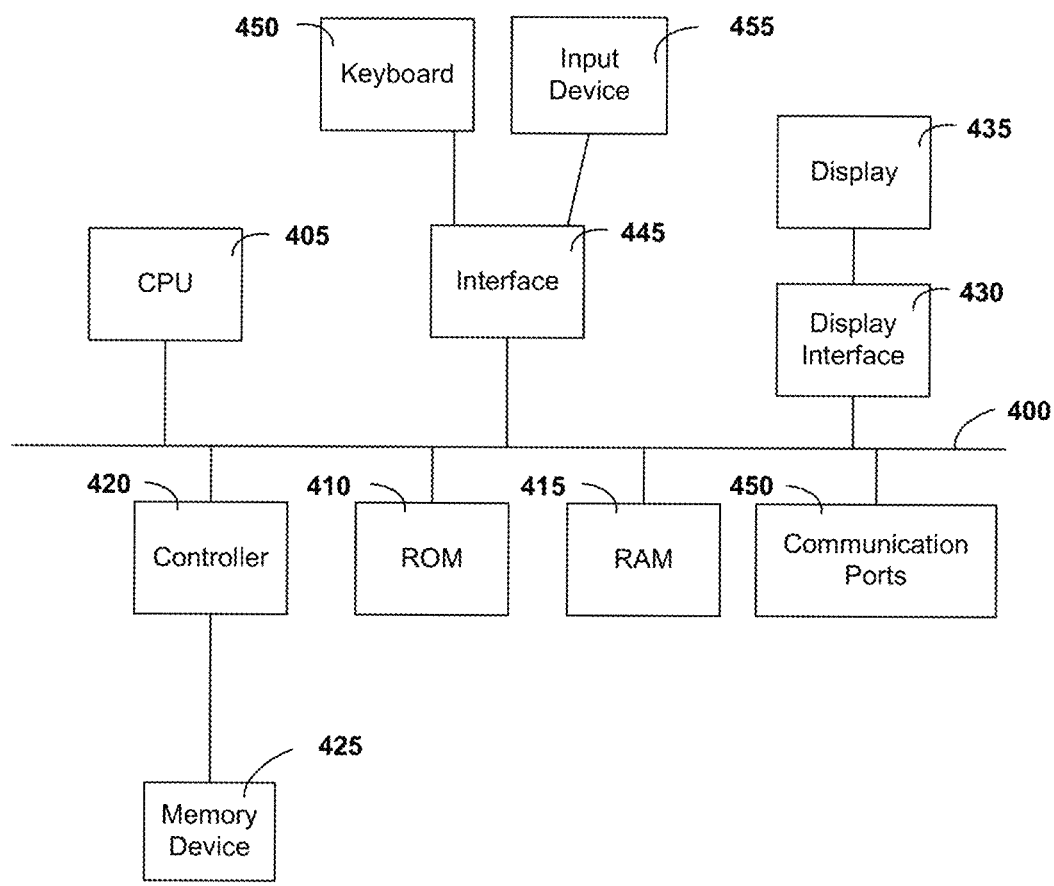
FIG. 4 depicts a block diagram of exemplary internal hardware that may be used to contain or implement the various computer processes and systems as discussed above.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with, among other things, analyzing a transport stream, inserting targeted content into a transport stream, and storing targeted data as described above may be stored in the ROM 430 and/or the RAM 435. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 430 may permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system comprising:
   a processor; and
   a non-transitory, computer-readable storage medium in operable communication with the processor, wherein the computer-readable storage medium contains one or more programming instructions that, when executed, cause the processor to:
   detect a content opportunity in a transport stream;
   determine a plurality of content elements addressed for the content opportunity;
   allocate bandwidth for a highest profile available version of each of the plurality of content elements to a highest profile available content stream responsive to the highest profile available content stream having sufficient resources; and
   allocate bandwidth for a lower profile version of each of the plurality of content elements remaining after allocation of the bandwidth for the highest profile available version of each of the plurality of content elements to a lower profile content stream,
   wherein the computer-readable storage medium further contains programming instructions that, when executed, cause the processor to prioritize the plurality of content elements based on a segment demographic.

2. The system of claim 1, wherein the transport stream comprises a high definition programming stream.

3. The system of claim 1, wherein the content opportunity comprises a portion of television advertising slot.

4. The system of claim 1, wherein the plurality of content elements comprise television advertising content.

5. The system of claim 1, wherein the highest profile available version comprises a high definition version.

6. The system of claim 1, wherein the lower profile available version comprises a standard definition version.

7. The system of claim 1, wherein the highest profile available version comprises a high definition version encoded at a first bitrate and the lower profile available version comprises a high definition version encoded at a second bitrate,
   wherein the second bitrate is lower than the first bitrate.

8. The system of claim 1, wherein the highest profile available version comprises a high definition version encoded at a first resolution and the lower profile available version comprises a high definition version encoded at a second resolution,
wherein the second resolution is lower than the first resolution.

9. The system of claim 1, wherein the computer-readable storage medium further contains programming instructions that, when executed, cause the processor to transform at least one of the plurality of content elements from a highest available profile version to a lower profile available version.

10. The system of claim 1, wherein the computer-readable storage medium further contains programming instructions that, when executed, cause the processor to:
detect a second content opportunity in a second transport stream, wherein the second transport stream is a low profile transport stream and the transport stream is a high profile transport stream;
determine a plurality of second content elements addressed for the second content opportunity;
allocate bandwidth for each of the plurality of second content elements to a low profile transport stream prior to allocating the bandwidth for the plurality of content elements.

11. The system of claim 10, wherein the low profile transport stream is a standard definition transport stream and the high profile transport stream is a high definition transport stream.

12. The system of claim 10, wherein the transport stream transmits a high profile version of a television network and the second transport stream transmits a low profile version of the television network.

13. The system of claim 1 wherein the segment demographic is chosen from the group consisting of age, income, customer premise equipment, education, geographic location, gender, and purchase history.

14. A method comprising:
detecting a content opportunity in a transport stream;
determining a plurality of content elements addressed for the content opportunity;
allocating bandwidth for a highest available profile version of each of the plurality of content elements to a highest profile available content stream responsive to the highest profile available content stream having sufficient resources; and
allocating bandwidth for a lower profile version of each of the plurality of content elements remaining after allocation of the bandwidth for the highest profile available version of each of the plurality of content elements to a lower profile content stream,
wherein the plurality of content elements are prioritized based on a segment demographic.

15. The method of claim 14, wherein the transport stream comprises a high definition programming stream.

16. The method of claim 14, wherein the content opportunity comprises at least a portion of a television advertising slot.

17. The method of claim 14, wherein the plurality of content elements comprise television advertising content.

18. The method of claim 14, wherein the highest profile available version comprises a high definition version.

19. The method of claim 14, wherein the lower profile available version comprises a standard definition version.

20. The method of claim 14, wherein the highest profile available version comprises a high definition version encoded at a first bitrate and the lower profile available version comprises a high definition version encoded at a second bitrate,
wherein the second bitrate is lower than the first bitrate.

21. The method of claim 14, wherein the highest profile available version comprises a high definition version encoded at a first resolution and the lower profile available version comprises a high definition version encoded at a second resolution,
wherein the second resolution is lower than the first resolution.

22. The method of claim 14, wherein the computer-readable storage medium further contains programming instructions that, when executed, cause the processor to transform at least one of the plurality of content elements from a highest available profile version to a lower profile available version.

23. The method of claim 14, further comprising:
detecting a second content opportunity in a second transport stream, wherein the second transport stream is a low profile transport stream and the transport stream is a high profile transport stream;
determining a plurality of second content elements addressed for the second content opportunity;
allocating bandwidth for each of the plurality of second content elements to a low profile transport stream prior to allocating the bandwidth for the plurality of content elements.

24. The method of claim 23, wherein the low profile transport stream is a standard definition transport stream and the high profile transport stream is a high definition transport stream.

25. The method of claim 24, wherein the transport stream transmits a high profile version of a television network and the second transport stream transmits a low profile version of the television network.

26. A non-transitory computer-readable storage medium storing computer-readable instructions that, when executed by a processor of a computing device, cause the computing to perform operations comprising:
detecting a content opportunity in a transport stream;
determining a plurality of content elements addressed for the content opportunity;
allocating bandwidth for a highest available profile version of each of the plurality of content elements to a highest profile available content stream responsive to the highest profile available content stream having sufficient resources;
allocating bandwidth for a lower profile version of each of the plurality of content elements remaining after allocation of the highest profile available version of each of the plurality of content elements to a lower profile content stream; and
prioritizing the plurality of content elements based on a segment demographic.

27. The non-transitory computer-readable storage medium of claim 26, further comprising:
transforming at least one of the plurality of content elements from a highest available profile version to a lower profile available version.

28. The non-transitory computer-readable storage medium of claim 26, further comprising:
detecting a second content opportunity in a second transport stream, wherein the second transport stream is a low profile transport stream and the transport stream is a high profile transport stream;

determining a plurality of second content elements addressed for the second content opportunity;

allocating bandwidth for each of the plurality of second content elements to a low profile transport stream prior to allocating the bandwidth for the plurality of content elements.

29. The non-transitory computer-readable storage medium of claim 26, wherein the low profile transport stream is a standard definition transport stream and the high profile transport stream is a high definition transport stream.

30. The non-transitory computer-readable storage medium of claim 26, wherein the transport stream transmits a high profile version of a television network and the second transport stream transmits a low profile version of the television network.

* * * * *